Patented Feb. 5, 1935

1,990,213

UNITED STATES PATENT OFFICE 1,990,213

REMOVAL OF SUBSTANCES FORMING RESINS FROM BENZINES

Fritz Winkler and Hans Haeuber, Ludwigshafen-on-the-Rhine, Germany, assignors to I. G. Farbenindustrie Aktiengesellschaft, Frankfort-on-the-Main, Germany No Drawing. Application July 28, 1933, Serial No. 682,664. In Germany September 6, 1932

6 Claims. (Cl. 204—31)

The present invention relates to improvements in the removal of substances forming resins from benzines, in particular from those which are to be employed as motor fuels.

It has already been proposed to purify benzines, especially cracking benzines, which by reason of their content of olefines have an especially favourable anti-knock value but which at the same time contain substances tending to form resins, by exposing them to the action of polymerizing agents, such as concentrated sulphuric acid, aluminium chloride, iron chloride or other inorganic halides of the Friedel Crafts type. In this manner a more or less far-reaching polymerization of the undesirable unsaturated constituents is effected and labile compounds are converted into stable polymerization products which are then separated from the benzine by the usual refining, especially by treatment with adsorption agents and subsequent distillation. In order to remove the substances tending to form resins as far as possible, however, a very intense treatment with the polymerizing agents is necessary and there is therefore a danger that not only injurious, but also valuable constituents which increase the anti-knock value may be removed.

We have now found that the said objection is avoided when subjecting the said crude benzines to the action of the said chemically active polymerizing agents under conditions milder than those required for the total removal of the gum-forming substances contained in the benzines and also exposing the benzines to be purified to the action of silent electric discharges, which may be effected before or preferably after the treatment with the said polymerizing agents. The said operation with polymerizing agents under mild conditions may be effected by treating the benzines with about from 30 to 50 per cent of the polymerizing agent, such as aluminium chloride necessary for removing the total content of the gum-forming substances and treating during a period amounting to form 50 to 30 per cent of that required in the latter case. Also lower temperatures may be employed for rendering the polymerization treatment milder. In this case the durations of treatment are selected somewhat longer or the amounts of polymerizing agents are selected somewhat larger than when operating at higher temperatures. The action of the silent electric discharges is preferably carried out before the treatment with adsorption agents, such as bleaching earths, which latter treatment, if carried through, is in any case the final operation step before removing the polymerized substances from the body of benzine. The duration and intensity of the electric treatment depends on the character of the benzine to be treated; the field strength to be employed may attain to the effective field strength dependent on the arrangement of the apparatus for the time being. When working with alternating current, the frequency may vary from the frequency of the usual alternating current, i. e. from a frequency of about 50 periods per second, up to the periodicity produced by a Tesla transformer. The most favourable conditions may be readily ascertained by a preliminary experiment. The hydrocarbon oils to be purified may be continuously passed between the surfaces of the two electrodes or they may also be treated in batches in substantially quiet state. The tension of the currents employed is preferably above 1000 volts per centimetre of distance between the electrodes, but also lower voltage currents may be employed.

According to this invention, not only may benzines which have already been refined in any suitable manner, as for example freed from constituents boiling above 200° centigrade by fraction, be considerably improved, but also crude products, such as are obtained especially by the vapour phase cracking of oils. With these products it is preferable to proceed by adding thereto the substances having polymerizing action, as for example the double compound of aluminium chloride and ethylene or other gaseous olefine and warming for some time, then taking up the aluminium chloride by the addition of aqueous hydrochloric acid, separating the aqueous liquid, drying the hydrocarbon mixture and then exposing them to the action of silent electric discharges without previously separating the constituents of higher boiling point.

The following example will further illustrate the nature of this invention but the invention is not restricted to this example.

Example

A cracking benzine boiling up to 200° centigrade which has been purified by treatment with 1 per cent of aluminium chloride at from 60° to 70° centigrade and which yields a residue of about 0.450 gram per 100 cubic centimetres in the oxygen test is exposed for 3 hours at room temperature to high voltage alternating current discharges which are produced by a Tesla transformer. The benzine is then refined in the usual manner by distillation, preferably after the addition of an adsorption agent, such as bleaching earth. After passing oxygen for 3 hours through the benzine heated on the water bath under a reflux condenser, a residue of 0.010 gram per 100 cubic centimetres not capable of being evaporated remains, while, without the electric treatment, this residue would amount to about 0.360 gram per 100 cubic centimetres.

The electric treatment may be carried out in an inert atmosphere or in an atmosphere of hydrogen. The benzine should not contain water or other substances which conduct the current.

When in the aforedescribed treatment a direct current of 30,000 volts is employed instead of the high voltage alternating current the same purifying effect is obtained already after 5 minutes. In the case of an ordinary alternating current of 220 volts and a frequency of 50 periods per second 16 hours are required for producing the same effect.

What we claim is:

1. A process for the removal of substances having a marked tendency to form gums from benzines containing the same together with valuable unsaturated hydrocarbons, which comprises subjecting such benzine to the action of a polymerizing agent under conditions sufficient for polymerizing part of the gum-forming substances but milder than those necessary for the complete polymerization of the gum-forming substances, and also, but non-simultaneously with the action of the polymerizing agent, to the action of silent electric discharges, and then separating the polymerized substances from the benzine.

2. A process for the removal of substances having a marked tendency to form gums from benzines containing the same together with valuable unsaturated hydrocarbons, which comprises subjecting such benzine to the action of a polymerizing agent under milder polymerization conditions than are necessary for the complete polymerization of the gum-forming substances, and subsequently to the action of silent electric discharges, and then separating the polymerized substances from the benzine.

3. A process for the removal of substances having a marked tendency to form gums from benzines containing the same together with valuable unsaturated hydrocarbons, which comprises subjecting such benzine to the action of a polymerizing agent selected from the group consisting of inorganic halides of the Friedel Crafts type and sulphuric acid, under conditions sufficient for polymerizing part of the gum-forming substances but milder than those necessary for the complete polymerization of the gum-forming substances, and also, but non-simultaneously with the action of the polymerizing agent, to the action of silent electric discharges, and then separating the polymerized substances from the benzine.

4. A process for the removal of substances having a marked tendency to form gums from benzines containing the same together with valuable unsaturated hydrocarbons, which comprises subjecting said benzine to the action of a polymerizing agent selected from the group consisting of inorganic halides of the Friedel Crafts type and sulphuric acid, under milder polymerization conditions than are necessary for the complete polymerization of the gum-forming substances, and subsequently to the action of silent electric discharges, and then separating the polymerized substances from the benzine.

5. The process as defined in claim 1 in which the benzines containing gum-forming substances are treated with about from 30 to 50% of the amount of polymerizing agent necessary for the complete polymerization of the said gum-forming substances and the treatment is continued during a period amounting to from 50 to 30% respectively of that required for such complete polymerization.

6. The process as defined in claim 1 in which the polymerizing temperatures employed are lower than those at which complete polymerization of the gum-forming substances will be obtained under otherwise identical conditions.

FRITZ WINKLER.
HANS HAEUBER.